United States Patent [19]

Steinberg

[11] 3,743,426
[45] July 3, 1973

[54] MULTICHANNEL EXHAUST GAS ANALYZER

[75] Inventor: Martin Steinberg, Santa Barbara, Calif.

[73] Assignee: General Motors Corporation, Detroit, Mich.

[22] Filed: Nov. 26, 1971

[21] Appl. No.: 202,492

[52] U.S. Cl. ................ 356/96, 356/183, 356/188, 356/205, 356/246, 250/43.5 R
[51] Int. Cl. .............................................. G01j 3/42
[58] Field of Search .............. 356/51, 96, 97, 183, 356/205, 246, 78, 83; 250/43.5 R

[56] References Cited
UNITED STATES PATENTS

| | | | |
|---|---|---|---|
| 2,612,608 | 9/1952 | Miller | 250/43.5 R |
| 3,089,382 | 5/1963 | Hecht et al. | 356/51 X |
| 3,153,722 | 10/1964 | Bayly et al. | 356/51 X |
| 3,526,462 | 9/1970 | McCurdy et al. | 356/246 |
| 3,696,247 | 10/1972 | McIntosh et al. | 356/51 X |

Primary Examiner—Ronald L. Wibert
Assistant Examiner—Paul K. Godwin
Attorney—Eugene W. Christen, Albert F. Duke et al.

[57] ABSTRACT

The exhaust gas to be monitored is passed through a plurality of adjacently positioned serially connected absorption cells of varied length. A chopper wheel carrying a plurality of spectral filters sequentially passes radiation from a source at discrete wave-lengths each cell in sequence. The amount of radiation absorbed by the gas is detected to determine the concentrations of certain components in the gas.

2 Claims, 3 Drawing Figures

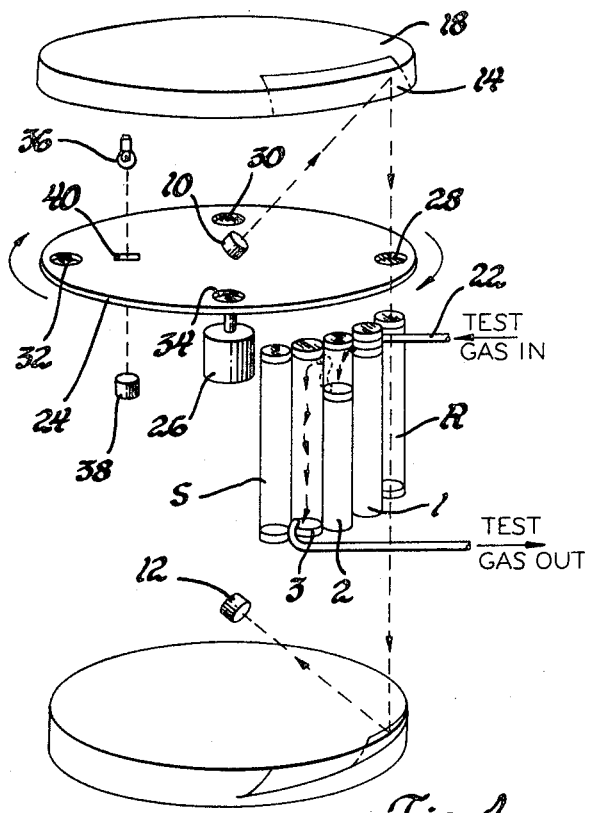
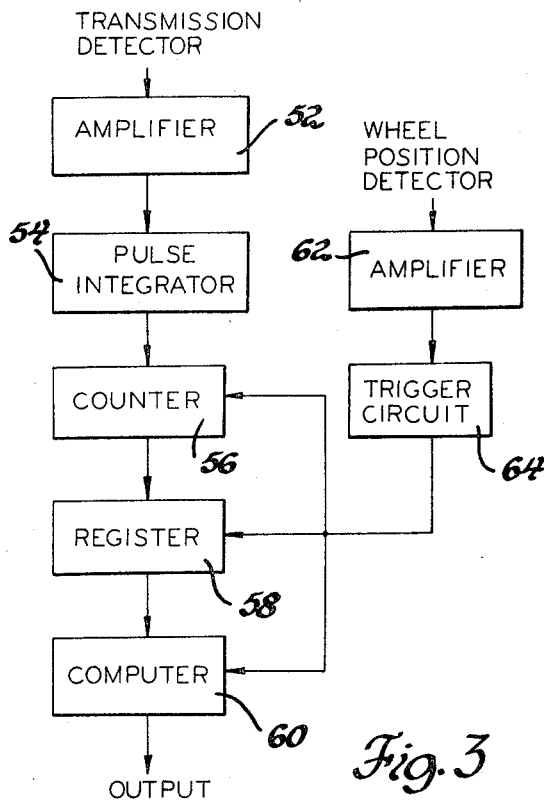
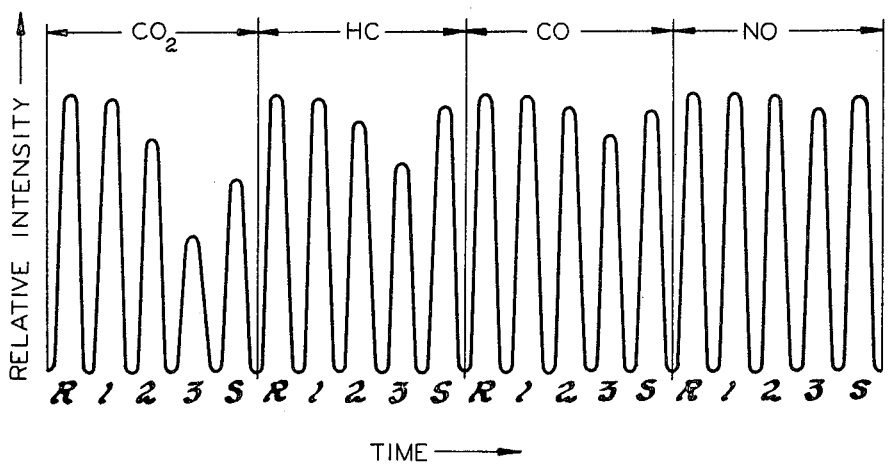
INVENTOR.
Martin Steinberg

MULTICHANNEL EXHAUST GAS ANALYZER

This invention relates to apparatus for determining the concentration of particular components of a multicomponent mixture of gases and more particularly to apparatus for analyzing the exhaust of motor vehicles, for determining the time variant concentration of components in the exhaust by measuring the absorption of the exhaust at selected optical wave-lengths.

A variety of gas analyzers have been proposed in the past for determining the concentration of various components in a gas mixture. However, because of their size and cost such prior art devices have primarily been restricted in use to large testing facilities.

It is an object of the present invention to provide a compact light weight and economical gas analyzer particularly suited for monitoring exhaust gases of a motor vehicle.

As will be set forth in more detail hereinafter, the proposed system monitors the time variant concentration of a multicomponent mixture of gases by measuring the absorption at selected optical wave-lengths. Wave-length selection is achieved by an array of interference filters rotated on a chopper wheel. The system employs a single source and single detector, capable of operation over the spectral range of the several chemical components to be monitored. The system employs several absorption cells of varied lengths to accomodate large variations and concentrations or absorption strengths of the various components in the gas mixture. The spectral filters are sequentially inserted in the optical paths between the source and the detector through each of the different absorption cells. Thus, the source and detector are time shared by the various channels.

A more complete understanding of the present invention may be had from the following detailed description which should be read in conjunction with the drawings in which:

FIG. 1 shows the various components of the multichanneled gas analyzer by the present invention;

FIG. 2 shows a representative waveform obtained from the analyzer of the present invention;

FIG. 3 shows in block diagram form, signal processing electronics for use with the analyzer of the present invention.

Referring now to the drawings and initially to FIG. 1 the components of the analyzer of the present invention are shown and includes a source 10 and a detector 12 capable of operation over the spectral range of the several chemical components to be monitored. The source 10 may be a Nernst glower, a Glowbar, or any of a number of electrically heated thermal sources. The detector 12 may be one of a variety of sensitive and rapid responsive quantum detectors such as Indium, Antinomide, Lead Selenide, and Mercury-Cadmium Telluride detectors. The radiation path between the source 10 and the detector 12 is formed by a pair of parabolic mirrors 14 and 16 mounted in holders 18 and 20 respectively. Infrared transmitting lenses and flat mirrors could similarly be used to establish the radiation path between the source 10 and the detector 12. The source 10 and detector 12 are located at the foci of the parabolic mirrors 14 and 16.

The analyzer employs a plurality of absorption test cells 1, 2 and 3 located in the radiation path between the source 10 and the detector 12. The cells 1, 2 and 3 are of various lengths to accomodate large variations in concentration of, or absorption strength of the various components in the gas mixture. As shown in FIG. 1, the cell length increases from cell 1 to cell 2 to cell 3. A reference cell R containing a reference gas is located adjacent cell 1 and a span cell S containing a calibration span gas is located adjacent cell 3. All of these cells R, 1, 2, 3 and S have polished interiors to optimize transmission and sapphire windows to accomodate transmission at 5.3 microns for the determination of NO. The shorter cells, namely 1 and 2, have an extension beneath the lower window to match as much as possible the optical path encountered in passing through the longer cells. The test gas is passed through the test cells 1, 2 and 3 which are connected serially by a tubular conductor 22.

A chopper wheel 24 is rotatably driven by a motor 26 and is interposed between the source 10 and the detector 12. The chopper wheel 24 carries a plurality of spectral filters 28, 30, 32 and 34 which are sequentially positioned in the radiation path during rotation of the chopper wheel 24. Also, each of the filters 28 through 34 are sequentially positioned over the cells R, 1, 2, 3 and S. The source 10 and detector 12 are thus time shared by the various spectral channels. In the proposed application for the gas analyzer of the present invention the filters 28 through 30 are respectively 4.6 microns, 5.3 microns, 2.7 microns, and 3.4 microns, and are for monitoring for CO, NO, $CO_2$ and HC (unburned or partially oxidized hydrocarbons), as they exist in the exhaust of automotive vehicles. The system could be expanded to monitor $NH_3$ for example, or any other exhaust gas constituent having a spectral absorption in the operable range of the source-detector system.

The position of the chopper wheel 24 is monitored by means of an index source 36 and an index detector 38. A slot 40 in the wheel 24 passes light from the source 36 to the detector 38 each revolution of the wheel 24.

A waveform representation of the radiative pulses incident on the detector during one revolution of the wheel for a configuration such as shown in FIG. 1 is illustrated in FIG. 2. The labels R, 1, 2, 3 and S refer to the reference cell, test cells 1 through 3 in order of increasing length, and the span cell. Increasing or decreasing the number of cells or spectral channels would produce corresponding variations in the pulse train. The spectral distribution of the source output and spectral responses of the detector would tend to produce widely ranging reference pulse heights in the difference channels. The equalization of the reference pulse amplitudes can be achieved with neutral density filters in each channel to produce a pulse train of more nearly equal amplitude and tend to keep the system operative within the linear response range of the detector. As shown in FIG. 2, for each spectral channel a detector output is obtained which includes the unattenuated transmission through the reference cell followed by increasing attenuation in the exhaust passing through the test cells of increasing length and finally the span gas signal.

The output of the detector 12 and 38 may be suitably processed by signal processing means such as shown in FIG. 3. The output of the detector 12 is fed through an amplifier 52, a pulse integrator 54, a counter 56, a register 58 to a computer 60 while the wheel position output of the detector 38 is fed to an amplifier 62 to a trigger circuit 64 which provides an indexing signal to the counter 56, register 58 and computer 60. The signal processing electronics of FIG. 3 measures transmission by integrating the power in each pulse. An alternative approach could be the detection of pulse amplitudes. The computer 60 provides the time sharing logic and selects the reference and span signals and chooses the transmission signal through the test gas which lies in a range that yields an optimum measure of that constituent. Thus, for $CO_2$ at 12 percent to 15 percent in the exhaust gas, the transmission through one of the shorter cells would provide a good measure for that constituent, on the other hand the absorption by a low concentration of HC or NO would be very slight to the short cell and the computer is programmed to take this measurement from the longer cells. Once each rotation of the chopper wheel 24 data is taken of the source and detector performance for each spectral channel through the reference cell R and a check is made of system performance through the span cell S containing the calibration span gas. Since the various cells may have identical positions in the optical system relative to the source and detector each test cell must be periodically calibrated by the passage of a zero gas and a span gas between tests. Once a relation is made between the response to the span gas in each test cell and the span cell response it is possible to use the internal span gas standard as an interim standard and reduce the frequency of use of the external standard.

I claim:

1. A multichannel exhaust gas analyzer for monitoring the time variant concentrations of a multicomponent mixture of gases by measuring the absorption by the mixture at selected optical wavelengths comprising, a radiation source, a detector, means establishing a radiation path between said source and said detector, a plurality of absorption cells of different lengths located in said radiation path, means for communicating said mixture serially through said plurality of absorption cells, a reference cell containing a reference gas located adjacent the first of said absorption cells, a span cell containing a calibration gas located adjacent the last of said absorption cells, a rotatable chopper wheel interposed between said source and said detector and containing a plurality of spectral filters arranged to be sequentially positioned in said radiation path during rotation of said chopper wheel, each of said filters sequentially passing radiation of a particular optical wavelength through each of said cells, and means for rotating said chopper wheel.

2. A multichanneled exhaust gas analyzer for monitoring the time variant concentrations of a multicomponent mixture of gases by measuring the absorption by the mixture at selected optical wavelengths comprising, an electrically heated radiation source, a quantum detector, a pair of parabolic mirrors for collimating radiation from said source to said detector, a plurality of absorption cells of different lengths located in said radiation path, means for communicating said mixture serially through said plurality of cells, a reference cell containing a reference gas located adjacent the first of said absorption cells, a span cell containing a calibration span gas located adjacent the last of said plurality of absorption cells, a rotatable chopper wheel interposed between said source in said detector and containing a plurality of spectral filters arranged to be sequentially positioned in said radiation path during rotation of said chopper wheel, each of said filters sequentially passing radiation of a particular wavelength through each of said cells, an indexing light source, an indexing detector, an index slot formed in said wheel for communicating the light from said indexing light source through said indexing detector, means for rotating said chopper wheel, and electronic signal processing means responsive to the output of said quantum detector and said indexing detector for determining said concentrations.

* * * * *

PO-1050
(5/69)

UNITED STATES PATENT OFFICE
CERTIFICATE OF CORRECTION

Patent No. 3,743,426               Dated July 3, 1973

Inventor(s) Martin Steinberg

It is certified that error appears in the above-identified patent and that said Letters Patent are hereby corrected as shown below:

In the ABSTRACT, line 5, after "wave-lengths" insert -- through --. Column 3, line 19, after "may" insert -- not --.

Signed and sealed this 19th day of February 1974.

(SEAL)
Attest:

EDWARD M. FLETCHER, JR.
Attesting Officer

C. MARSHALL DANN
Commissioner of Patents